Patented Dec. 1, 1942

2,303,746

UNITED STATES PATENT OFFICE 2,303,746

WELDING ROD

Theodore Ephraim Kihlgren, West New Brighton, Staten Island, N. Y., and Raymond Francis Vines, Plainfield, N. J., assignors to The International Nickel Company, Inc., New York, N. Y., a corporation of Delaware No Drawing. Application November 29, 1941, Serial No. 420,966. In Canada October 28, 1941

15 Claims. (Cl. 219—8)

The present invention relates to a nickel arc welding rod and, more particularly, to a nickel arc welding rod capable of use in all positions and for single as well as multiple bead welding.

Nickel arc welding electrodes which had been known to the prior art all suffered from certain disadvantages which rendered their use difficult and in many cases unsatisfactory. Among the defects and difficulties of prior art nickel arc welding rods were the following: The welding rods often could not be used in all positions. Thus, for example, a welding rod which gave comparatively satisfactory results when used for downhand welding would be unsatisfactory for making vertical welds or overhead welds, and vice versa. Similarly, a weld rod which was satisfactory for single bead welds might be entirely unsatisfactory for multiple bead welding. For this reason it was necessary to stock large varieties of electrodes to meet various conditions and requirements. While prior art electrodes have been used for commercial welding over a period of years, a very close control of technique and recourse to inconvenient expedients were required to get acceptable results. With increasing severity of requirements, it has been more and more difficult to obtain acceptable results with prior art electrodes. Many prior art flux coatings have been sensitive to variations in composition of the core wire or rod and the coated rods have been sensitive to variation in the coating thickness and the welding current. The beads laid down by prior art welding rods often piled up high above the plane of the sheets or plates being welded. It was also necessary to have an included angle of at least about 75° for welding these plates. It has also been necessary to resort to the use of coatings of complex composition and even under these circumstances the coatings have cracked on drying or flaked in use, or have required special drying conditions, and have proved unstable upon storage. In use the coatings exhibited uneven burn-off making them inoperable in critical welding. The rapid setting rate of some prior art coating compositions has been troublesome, with the result that large batches of the coating material have sometmes been wasted due to premature setting. The welds produced by prior art welding rods in many cases have been porous, weak, brittle and deficient in corrosion resistance.

We have invented a nickel arc welding rod which overcomes the defects and deficiencies of the prior art compositions.

It is an object of the present invention to provide a universal welding rod capable of use in all positions in both single and multiple bead welding.

Another object of our invention is the provision of a flux coating for nickel arc welding rods which will be insensitive to considerable variation in core wire composition.

It is a further object of the present invention to provide welding rods which are comparatively insensitive to variation in coating thickness and welding current.

The invention contemplates the provision of nickel arc welding rods capable of depositing substantially flat beads and which may be used for welding plates having an included angle as low as about 30°, permitting substantial savings in electrode consumption.

It is also within the contemplation of the present invention to provide a flux coating for arc welding rods of comparatively simple composition which can be stored prior to extrusion for a considerable time without undue setting.

A further object of the present invention is the provision of an extrudable flux composition which does not require special closely controlled drying conditions and which is resistant to cracking on drying.

The invention also purposes the provision of coated electrodes which are stable over long periods of time.

It is further within the contemplation of the present invention to provide coated arc welding rods in which the coating is characterized by uniform burn-off and resistance to flaking in use.

The invention also contemplates the provision of nickel arc welding rods capable of producing sound, strong, ductile welds of high nickel content having corrosion resistance equivalent to that of wrought nickel.

It is likewise within the contemplation of the present invention to provide nickel arc welding electrodes capable of use for welding light gauge nickel sheet as well as nickel plate having a thickness of one inch or more.

Other objects and advantages of the present invention will become apparent from the following description of the invention.

Broadly stated, the "all position" welding rod of the present invention includes a metal core wire or rod and a coating or covering of a special flux.

Ordinarily the metal core wire will contain over about 98% nickel with small amounts of the usual malleabilizing and/or deoxidizing elements and impurities including copper, carbon, manganese, iron, silicon, titanium, magnesium and sulphur. In some cases it may be found advantageous to include up to about 0.8% Si, up to about 0.3% magnesium and up to about 2% titanium in accordance with the disclosures of Pilling U. S. Patent No. 1,916,386 and Pilling and Kihlgren U. S. Patent No. 1,920,432. A typical heat of metal which gave excellent results in commercial scale tests was found, on analysis, to contain approximately 0.05% C, 0.43% Si, 0.38% Ti, 0.12% Fe, 0.26% Mn, 0.005% S, 0.03% Cu, 98.6% Ni.

The flux comprises fluorides of alkaline earth metals and alkali metals, preferably calcium and sodium; titanium, advantageously as a nickel-titanium alloy; and carbonaceous material, preferably including graphite and dextrine. To prepare the flux for application to the core, the fluorides, titanium and graphite, in powdered form, are combined with a mixture of dextrine and water, or a solution of dextrine. The dextrine binds the powdered ingredients together as an adherent coating and exerts a controlling influence on the workability of the coated rod; the latter function of the dextrine is surprising and of extreme importance.

Generally speaking, the amounts of the various ingredients present in the flux coating should fall within the following ranges:

|  | Parts by weight |
|---|---|
| $CaF_2$ | 50–90 |
| NaF | 50–10 |
| Ti | 10–30 |
| C | 0–20 |

The Ti is preferably present as an alloy with a carrier metal compatible with the metal of the welding rod, e. g., nickel for nickel welding rods. A suitable titanium nickel alloy contains about 25% titanium with the balance largely nickel. These ingredients, in powdered form, are mixed with a dextrine binder, as hereinafter described, the amount of dextrine being between about 6% and 11% of the total weight of the coating.

The ingredients of the flux coating preferably fall within the ranges given in Table I which also contains a specific example illustrating the invention.

Table I

Composition

| Ingredients | Composition | | |
|---|---|---|---|
|  | Preferred ranges parts by weight | Specific example | |
|  |  | Parts by weight | Percent by weight |
| $CaF_2$ | 60–80 | 70 | 35.9 |
| NaF | 40–20 | 30 | 15.4 |
| Ti[1] | 20–25 |  |  |
| NiTi[2] |  | 90 | 46.1 |
| C | 2–8 | 5 | 2.6 |

[1] Preferably present as an alloy with a carrier metal compatible with the metal of the welding rod.
[2] Present as an alloy containing about 25% Ti.

Within the foregoing ranges, the operating characteristics of the welding rod and, to a certain extent, the properties of the weld can be modified by varying the relative amounts of the ingredients in the coating. The following examples in Table II will illustrate the effect of varying the amounts of $CaF_2$, NaF, C and NiTi in the coating, the values given representing weight percent of the ingredients exclusive of the dextrine. These rods were coated by extrusion and air dried or oven dried at temperature not above about 150° F.

Table II

| Rod No. | $CaF_2$ | NaF | C | NiTi[1] | $CaF_2$:NaF ratio |
|---|---|---|---|---|---|
| 1 | 30.8 | 20.5 | 2.6 | 46.1 | 60:40 |
| 2 | 35.9 | 15.4 | 2.6 | 46.1 | 70:30 |
| 3 | 41 | 10.3 | 2.6 | 46.1 | 80:20 |
| 4 | 36.9 | 15.8 | 0 | 47.4 | 70:30 |
| 5 | 33.3 | 14.3 | 9.5 | 42.9 | 70:30 |
| 6 | 42.4 | 18.2 | 3.0 | 36.4 | 70:30 |

[1] About 25% Ti.

The composition of rod No. 1 should be extruded at a pressure above about 3500 lbs. per square inch to secure uniformity of electrode burn-off. The electrode workability is satisfactory and good welds can be readily produced. The coating composition of rod No. 2 is quite insensitive to extrusion pressures, being distinctly better than the coating of rod No. 1 in this respect. Though slightly inferior to the coating composition of rod No. 2, the workability of rod No. 3 was good and high quality welds are readily produced with this rod. It will be seen from the table that the coating of rod No. 4 did not contain free carbon. The workability of this welding rod was fairly good, although the drop frequency was somewhat slower than rod No. 2, for example. There was also a slightly greater tendency to porosity in the restrike areas when using rod No. 4. Rod No. 5, on the contrary, contained about 9.5% graphitic carbon. The workability of rod No. 5 was fair and it was used quite satisfactorily for single bead work. In multiple bead welds it was found that the ductility of the weld was somewhat reduced, apparently due to graphite precipitation in the weld metal. The amount of nickel-titanium powder in rod No. 6 is somewhat less than the preferred amount. The workability of rod No. 6, however, is fair, but the melting rate of the coating is somewhat slower than rod No. 2, and there is a slightly greater tendency for pinhole porosity in restrike areas. All of the foregoing rods, however, can be used satisfactorily in commercial scale welding to give distinctly better results than could be obtained under comparable conditions with prior art welding electrodes.

The ingredients of the coating are preferably so proportioned or related to each other, in a manner more fully described hereinafter, as to produce a coating which burns off sufficiently slowly to produce a shallow crucible at the arc end of the rod during use. The rate of burn-off can be controlled by varying the ratio of the calcium fluoride to the sodium fluoride, as illustrated in the foregoing examples of Table II. The amount of nickel-titanium powder also influences the burn-off rate as described more fully hereinafter. The optimum ratio of calcium fluoride to sodium fluoride depends somewhat upon the nature of the dextrine which is used in the flux coating. When the dextrine having the characteristics described hereinafter is used, we have found it advantageous to maintain a ratio of calcium fluoride to sodium fluoride of about 70:30. When used in this ratio, the flux is quite insensitive to variations in the extrusion pressure and satisfactory coatings have been produced over a wide range of extrusion pressures. For instance good results were obtained over the range 1000 to 5000 pounds per square inch. When the calcium fluoride to sodium fluoride ratio approaches 60:40 it is necessary to use high extrusion pressures but the results are still satisfactory as far as performance of the coated weld rod is concerned. With a calcium fluoride to sodium fluoride ratio of about 80:20 results intermediate between those obtained with the two foregoing ratios have been obtained. The ratio of calcium fluoride to sodium fluoride should lie between 90:10 and 50:50, preferably between 80:20 and 60:40.

The fluorides are preferably powdered to about 200-230 mesh. It has been found advantageous in practice to use "packing density" as an index to the suitability of the calcium and sodium fluoride powders. The approximate packing density can be obtained by a simple test comprising filling a suitable container of known volume with the material to be measured, tapping the sides of the container lightly and scraping the excess powder from the top of the container. The weight of the contents may then be determined and the density in grams per cubic centimeter calculated. Satisfactory results have been obtained with the following packing densities:

|  | Grams per cubic centimeter |
|---|---|
| Calcium fluoride | 1.3–1.5 |
| Sodium fluoride | 0.7–0.8 |

In the coatings for rods 1 to 6 the packing density of the $CaF_2$ was about 1.35 and the NaF was about 0.7.

Titanium is an essential ingredient of the flux coating if sound and ductile welds are to be obtained. Examples illustrating th eeffect of titanium additions are given in Table III. In these examples titanium was added in the form of a nickel-titanium alloy containing about 25% Ti to a flux coating comprising about 70 parts calcium fluoride, 30 parts sodium fluoride, and 5 parts graphite. These ingredients, in powdered form, were combined with a water solution of about 16 parts of a white potato dextrine having a solubility of about 38% and then extruded around the nickel core wire.

*Table III*

| Rod No. | Parts Ti added [1] | Coating composition (weight percent) | | | | |
|---|---|---|---|---|---|---|
|  |  | $CaF_2$ | NaF | C | NiTi [1] | Dextrine |
| 7 | 0 | 57.8 | 24.8 | 4.2 | 0 | 13.2 |
| 8 | 7.5 | 46.3 | 19.9 | 3.3 | 19.9 | 10.6 |
| 9 | 15 | 38.6 | 16.6 | 2.8 | 33.1 | 8.9 |
| 10 | 22.5 | 33.2 | 14.2 | 2.4 | 42.6 | 7.6 |
| 11 | 30 | 29.1 | 12.4 | 2.1 | 49.8 | 6.6 |

[1] Added as a 25% Ti alloy with nickel.

Rod No. 7, which contained no titanium, yielded only moderately sound welds in continuous single bead welding and the crater areas were very porous. The melting rate of the flux was much too slow. Rod No. 8 worked quite well, though exhibiting slower drop frequency than rod No. 10, and the restrike areas of single bead butt welds were quite porous. Some porosity was also present in the continuous portions of the weld. The titanium level of rod No. 8 is not high enough to obtain consistently sound welds. Rod No. 9 gave much improved results over rod No. 8, giving consistently sound welds in the continuous portions but in some restrike areas slight porosity occurred. Rod No. 10 gave the best combination of workability and weld soundness. No porosity at all could be found in the uninterrupted bead and there was very slight, if any, tendency to porosity in restrike areas. The additional titanium in the coating of rod No. 11 produced no improvement over rod No. 10. Still higher amounts of titanium are permissible but they are of little advantage and merely increase the cost of the electrode without substantial further improvement in workability and weld quality.

The titanium is preferably added in the form of a nickel-titanium alloy when the coating composition is used with a nickel welding rod. Experiments have been conducted which apparently demonstrate that titanium is the active ingredient of this alloy and that the nickel serves mainly as a carrier for the titanium. Thus, the addition of nickel powder to a coating similar to that of rod No. 7 led to excessive porosity throughout the weld. In some coatings, the use of other carriers than nickel may be permissible, e. g., an iron-titanium alloy may be used where the presence of iron in the weld metal is not objectionable.

A commercial nickel-titanium alloy which has proved satisfactory in practice fell within the following specification:

|  | Percent |
|---|---|
| Titanium | 25 to 28 |
| Aluminum | 5 to 7 |
| Iron | 2 to 5 |
| Silicon | 2 to 3.5 |

Balance substantially nickel.

It will be noted that the commercial nickel-titanium alloy contains in addition to nickel and titanium, some aluminum and silicon which appear to be harmless and possibly mildly beneficial. The nickel-titanium alloy is ground to powder so that about 80% will pass through a 200 mesh screen. This powder has a packing density of about 3.7 grams per cubic centimeter.

The carbonaceous material present in the coating must include dextrine. Dextrine functions in the coating not only as a binder but also exerts a distinct and controlling influence on the workability of the electrode. Variations in the amount and nature of dextrine used, and the method of preparation of the binder, will affect the flux extruding characteristics, the adhesion of the coating, the shrinkage and cracking tendencies of the coating on drying, the uniformity of "burn-off" of the coating during welding, the flaking tendencies of the coating during welding, the drop frequency, and other qualities which are involved in the term "electrode workability" as those skilled in the art will readily understand. Sound welds have been obtained using a wide variety of dextrines variously prepared for binders but the electrode workability in some cases was mediocre and often quite poor. For an "all position" electrode to be used in single and multiple bead welding, the electrode arc characteristics, especially the uniformity of melting rate of the coating, are extremely important. Electrodes that might "get by" for simple single bead butt welds on the flat may be entirely unacceptable for the more severe requirements of fillet and multiple bead welding due to the lack of adequate workability. In order to meet these requirements, we have found it necessary to employ dextrines which meet special requirements as hereinafter described.

In rods dried at temperatures below about 200° F. the specifications for the dextrine are rather critical as extensive experiments have demonstrated that dextrines having low viscosity and high solubility or those having high viscosity and low solubility yield unsatisfactory electrodes under many conditions of drying. The range of satisfactory solubility and viscosity depends, to some extent, upon the type of dextrine employed. A white potato dextrine, for example, having a solubility of about 20% was reasonably satisfactory for rods used in single bead welding, while a tapioca dextrine having a solubility of 25% was quite unsatisfactory. In general, the solubility rating of the potato and tapioca dextrines should be within the range of about 30% to 50% and about 30% to 55%, respectively, for best results. Because factors other than solubility and viscosity appear also to exert an influence on electrode workability, it is not practicable to define the satisfactory dextrines solely on the basis of solubility and viscosity. Moreover, blends of dextrines having individually too low and too high solubilities have been employed with satisfactory results, but in general we prefer to use a dextrine having the desired characteristics without blending. Dextrines of potato origin have given best results in commercial practice. In order to illustrate the effect of the solubility and viscosity of dextrine on the working characteristics of welding rods embodying the present invention, the results of representative tests are given in Table IV for electrodes subjected to air drying for two hours followed by oven drying for two hours at 130° F.

Table IV

| Rod No. | Dextrine No. | Type | Percent solubility | Relative viscosity [1] seconds | General rating |
|---|---|---|---|---|---|
| 12 | 1 | Potato | 20 | 93 | Usable in single bead butt welding on flat; not suitable for "all-position welding." |
| 13 | 2 | ...do | 38 | 32 | Very good "all-position" electrode. |
| 14 | 3 | ...do | 60 | 54 | Same as rod 12. |
| 15 | 1 and 3 | ...do | | 38 | Good "all-position" electrode. |
| 16 | 4 | Tapioca | 25-30 | 300 | Unsatisfactory. |
| 17 | 5 | ...do | 52 | 97 | Good "all-position" electrode. |
| 18 | 4 and 5 | ...do | 40 | 183 | Do. |
| 19 | 6 | ...do | 80 | 26 | Unsatisfactory. |
| 20 | 7 | Corn | 51 | 22 | Same as rod 12. |
| 21 | 8 | ...do | 100 | | Unsatisfactory. |
| 22 | 9 | Sago | 100 | | Do. |

[1] Relative viscosity determined by cooking mixtures of 61.1 grams dextrine, 16 grams borax and 150 cc. water at 85° C., cooling the cooked mixture to 25° C. and measuring the time required for 200 cc. to flow out of 200 cc. pipette having a 2 mm. orifice.

A more reliable indication of the suitability of a particular dextrine than solubility and viscosity is furnished by a test conducted as follows:

A ⅛ inch diameter nickel wire 18 inches long is coated by extrusion to a thickness of about 0.023 inch (0.170 inch outside diameter) with the flux of our invention using the particular dextrine to be investigated. The flux consistency used is such that extrusion will be carried out at pressures between 1500 and 3000 P. S. I. The coated electrode is oven dried at 130–150° F. for two hours or more and is then ready for test.

The 18-inch electrode is stripped of flux in the center to make electrical contact with an electrode holder, leaving about 8½ inches of electrode on either side of the center grip. In making the test, the electrode is employed to deposit a bead upon the surface of a nickel plate at about 95 amperes, continuing the welding until the electrode is consumed right down to the center grip. Using the other half of the electrode, a similar bead is run at about 110 amperes to increase the severity of the test.

Results of carrying out of the test, which may appropriately be called the "burn-off test," on coated welding rods corresponding to those referred to in Table IV are given in Table V to illustrate the reaction of the coatings under the test conditions and to show the correlation of these results with the general rating of rods of the same kinds used for various types of welding.

Table V

| Rod No. | Plating | | General rating |
|---|---|---|---|
| | 95 amperes | 110 amperes | |
| 12a | Definite | Severe | Same as rod No. 12. |
| 13a | None | None | Same as rod No. 13. |
| 14a | Very slight to definite. | Definite to severe. | Same as rod No. 14. |
| 15a | None | Very slight | Same as rod No. 15. |
| 16a | Severe | Severe | Same as rod No. 16. |
| 17a | Very slight | Very slight | Same as rod No. 17. |
| 18a | ...do | ...do | Same as rod No. 18. |
| 19a | Severe | Severe | Same as rod No. 19. |
| 20a | Very slight to definite. | ...do | Same as rod No. 20. |
| 21a | Severe | ...do | Same as rod No. 21. |
| 22a | ...do | ...do | Same as rod No. 22. |

A uniform "burn-off" over the entire 8½ inch length under both conditions of test, with very slight flaking or substantially complete freedom from flaking of the coating above the arc, demonstrates the particular dextrine used to be satisfactory. Less satisfactory dextrines may not show flaking at 95 amperes but show severe flaking at 110 amperes. Such a dextrine might be employed for electrodes to be used in butt welding on flat work but would be unsuitable for vertical or overhead welding or for fillet welding. Dextrines which show marked flaking at 95 amperes are unsuitable for any type of welding.

With the flux composition which we have invented electrodes showing satisfactory behavior in the above "burn-off" tests, also have the other required characteristics such as proper drop frequency, arc stability, etc., which are comprised within the term "electrode workability."

The amount of dextrine used is critical. Too high a percentage of dextrine in the flux gives rise to excessive shrinkage cracking of the coating on drying, making the electrode quite unsatisfactory. At high dextrine levels, moreover, the electrode workability is unsatisfactory, the coating often flaking during welding. Too low a dextrine content will be accompanied by rather unsatisfactory arc characteristics, particularly slower drop frequency, and the adhesion of the coating to the welding rod may be inadequate. Generally speaking, we prefer to use dextrine in amounts of about 6 to 11% of the total weight of the flux.

The coating preferably contains carbon in addition to the carbonaceous material present as dextrine. Quite satisfactory welds have been obtained with carbon additions ranging from 0 to about 10%. Without carbon the electrode drop frequency is a little slower and the tendency to porosity in restrike areas is somewhat more pronounced. The presence of carbon promotes a steadier arc, improves soundness, and increases the drop frequency. Graphite and carbon black have given satisfactory results in practice. The carbon is used in powdered form, a packing density of about 0.64 having been found suitable. When carbon is used in amounts in excess of about 6%, the weld ductility decreases and for high ductility the carbon should not exceed about 5%. Preferably the carbon is maintained at about 3%, since larger amounts offer little further advantage from the standpoint of workability and the tendency for precipitation of graphite in the weld metal increases. The carbon used should be low in sulphur to avoid contamination of the weld metal with this element.

A convenient method of compounding the flux comprises placing dry dextrine in a suitable mixer, adding the correct amount of water at about 160 to 180° F., mixing the dextrine and water for about 20 minutes or more at about 160 to 180° F., then adding the mixture of dextrine and water, which will be referred to herein sometimes as a "solution," to the dry pre-mixed flux components and mixing until a thorough blending has been obtained.

The temperature of mixing the dextrine solution is important. When using a potato dextrine of the preferred type, if the temperature of mixing the dextrine and water is much below 160° F., the adhesion of the coating may be inadequate and the electrode burn-off may be non-uniform especially in the last portion, with an undesirable degree of flaking.

Satisfactory results have been obtained when the binder is mixed at temperatures of 155–185° F. and held for 15 minutes or more; the best combination of adhesion, extrudability and electrode workability being obtained when the binder solution is prepared at about 160–165° F. Higher mixing temperatures are permissible but not essential, and have some practical disadvantages.

With the dextrines we have found especially suitable, it is desirable to hold the binder at a temperature within the range of 155–185° F. at least 15 minutes to get the best results with respect to drop frequency and uniformity of burn-off. Shorter periods may result in somewhat less satisfactory arc characteristics and flaking of the coating in the latter stages of the electrode burn-off.

The pressure required to extrude the coating around the welding rods depends largely on the amount of liquid mixed with the powdered ingredients. Ordinarily if the dextrine and water are mixed in a ratio, by weight, between about 4:5 and 1:1, respectively, the amount of binder solution required to give the proper extrusion pressure will incorporate in the coating a quantity of dextrine within the critical range and approximating the preferred amount. Since the total amount of dextrine in the coating should be between 6% and 11%, we have found it advisable in obtaining proper flux consistency for extrusion to vary the proportion of water in the dextrine solution used rather than adding more or less of a standard dextrine solution. The optimum amount of water depends on the type of mixer and possibly other factors such as relative humidity etc. Too much water results in electrodes too wet to handle, greater difficulties in centering of the coating about the core, and, in excessively wet fluxes, unsatisfactory arc characteristics. If too little water is used, extrusion pressures may be impractically high.

The "burn-off" test may be used to determine the most satisfactory conditions for preparation of the binder as well as to investigate the suitability of various types of dextrines, as pointed out above.

The thickness of the flux coating will depend to a certain extent upon the diameter of the welding wire or rod. Table VI sets forth coating thicknesses which have been found satisfactory in practice.

Table VI

| Wire diameter | Desired O. D.[1] | Probable limits O. D. |
| --- | --- | --- |
| Inch | Inch | Inch |
| .075 | .110 | .100–.115 |
| .093 | .125 | .120–.130 |
| .125 | .170 | .160–.180 |
| .156 | .190 | .185–.200 |

[1] O. D.=outside diameter.

The flux coating of the present invention made with the preferred dextrine and extrusion conditions is characterized by insensitivity to drying conditions. A satisfactory and convenient method of drying such extruded flux coated welding rods comprises air drying for about 2 hours followed by oven drying for about 2 hours at about 130–200° F., although baking temperatures as high as about 400° F. have been used successfully. At this high temperature, long exposure ultimately impairs the adhesion of the coating to such a degree as to require care in handling the rods, although the working characteristics remain excellent. Generally speaking, about 2 to 4 hours at about 400° F. is very satisfactory. Longer baking times at about 400° F. produce a progressive loss in adhesion, while less than 1 hour at 500° F. leads to the same impairment of adhesion. In some instances where extrusion conditions were unsatisfactory or where the dextrine employed departed from the desired characteristics, electrodes dried in air for 2 hours followed by oven drying below 200° F. were subject to flaking in the burn-off test, whereas the use of the high baking temperature of 400° F. corrected this difficulty.

Nickel arc welding electrodes embodying the present invention have been found to overcome or substantially eliminate the difficulties and deficiencies of the prior art welding electrodes. The following specific examples are given to illustrate the unique properties of the flux coating and the coated electrode embodying the present invention.

EXAMPLE I

*Stability of wet flux*

The flux retains its plastic nature indefinitely when stored in a reasonably air-tight container after thorough mixing. This characteristic of the flux eliminates the necessity for complete discharge of the unused flux from the extrusion apparatus at the end of a day's run. This would be quite impossible to do with many prior art nickel electrode coatings containing a sodium silicate binder or other constituents which cause the flux to harden under the influence of time, temperature or both. As a specific instance illustrating the stability of the wet flux, a flux of the following composition was mixed, stored in a reasonably tight container for 4 days, and then satisfactorily extruded around the welding rods:

Dry flux:
  Calcium fluoride_ 31%.
  Sodium fluoride_ 20.5%.
  Carbon _____ 2.5%.
  Nickel-titanium _ 46%.
Binder:
  Potato dextrine__ 10.8% of total weight of dry flux.

Example II

Insensitivity of flux to varying drying conditions

An important feature of the flux embodying the present invention using a suitable dextrine and proper extrusion conditions is its relative insensitivity to deficiencies in drying, good results having been obtained with merely air dried electrodes as well as those dried in air followed by oven drying. This is an unusual characteristic of flux coatings and is of great importance from a production standpoint. To illustrate this feature of the present invention, butt welds of 1/8 inch nickel plate were made with two different welding rods having a nickel core of 1/8 inch diameter coated respectively with flux to a thickness of 0.023 and 0.029 inch. The coated electrodes were air dried for approximately 36 hours with no oven drying. The welds were substantially free of porosity and there was no failure when subjected to a 180° transverse face bend test. The conventional nickel electrode of the prior art, used under such conditions of drying, developed porous welds.

Example III

Stability of extruded coating

The stability of the extruded electrode coating is an important feature of the present invention. Excellent quality welds have been produced using experimental electrodes which had been coated and dried several months previous to welding and without redrying the rods before use. The coating showed no change in color, texture, or adherence over this period of time. The arc characteristics of these rods were satisfactory and the welds were free from pores.

Example IV

Insensitivity of the flux coating to variation in composition of core

The insensitivity of the flux coating to quite marked changes in core wire composition is an important feature of the present invention which distinguishes it from prior art coating compositions. This feature of the invention is well illustrated by the following welds on 1/8 inch nickel plate using 1/8 inch nickel weld rods having a flux coating of substantially the same analysis as Example I. The compositions of the nickel weld rods and the welding characteristics are given in Table VII.

Example V

Welds of high strength and ductility

Welds possessing a tensile strength well in excess of that of the unwelded plate coupled with high ductility, are easily obtained by using welding rods embodying the present invention. These welding rods deposit a flat bead of excellent appearance, especially in downhand welding and they can be satisfactorily used also for vertical and overhead welding. Table VIII illustrates the high strength and ductility of welds made in three different positions using rods embodying the present invention on 1/8 inch nickel plate. The excess weld metal was removed from the tensile specimens so that the weld was flush with the plate.

*Table VIII*

| Type of weld | Tensile strength psi | Elongation across weld in 1" | Location of fracture |
|---|---|---|---|
| Flat | 72,050 | 46 | In plate. |
| Vertical | 72,300 | 42 | Do. |
| Overhead | 72,600 | 42 | Do. |

Welds of surprisingly high ductility can be obtained on nickel plate having a thickness of one inch or more. For example, two pieces of one inch nickel plate were butt welded using a U-groove. In making this butt weld 14 beads were superimposed to obtain the complete weld. Several cross sections were polished and etched and found to be substantially free of porosity. A section 1/8 inch thick through the weld was bent through an angle of 180° over a 1/8 inch radius without cracking the weld metal.

An all weld metal specimen made by deposition of weld metal in a U-groove on 1 1/4 inch nickel plate using a 5/32 inch diameter nickel weld rod having a coating embodying the present invention about 0.017 inch thick had a tensile strength of 88,500 lbs. per square inch, and an elongation of about 25%.

The weld rod of the present invention may also be used for welding thick plates using a V-groove having an included angle as small as about 30°. With prior art coated rods it was often necessary to use an included angle of 60° to 75° or even more in order to obtain satisfactory results. The great decrease in size of the included angle made possible through the use of the welding rods of the present invention is of great importance com-

*Table VII*

| Rod | C | Si | Mn | Al | Ti | Mg | Arc characteristics | Transverse bend in restrike area | Porosity Continuous area | Porosity Restrike area |
|---|---|---|---|---|---|---|---|---|---|---|
| 23 | .09 | .11 | .12 | Nil | .05 | .05 | Very good | 180° O. K. | None | None. |
| 24 | .09 | .37 | .32 | Nil | .36 | .10 | do | do | do | Do. |
| 25 | | .50 | 2.0 | | | .12 | Excellent | do | do | Do. |
| 26 | .02 | 1.0 | | | | .044 | Good | 180° slight crack. | do | Do. |
| 27 | | 3.0 | | | | .12 | Fairly good | 180° O. K. | do | Do. |
| 28 | | .02 | | 2 | 1 | | Fair | 180° slight crack. | do | Slight. |
| 29 | .08 | .46 | .22 | 1.23 | .42 | .08 | Good | do | do | Very slight. |

It will be noted from Table VII that slight differences were observed in the electrode characteristics but all of the welding rods were satisfactory and in general the quality of the weld deposits was high.

mercially due to the substantial reduction in the amount of weld metal required for joints of this general type.

Excellent quality welds have also been obtained on thin nickel sheet having a thickness of about 0.03 inch using electrodes having a core diameter of about 0.075 inch. The operating characteristics of the electrode were very satisfactory even on plate of this thin gauge.

EXAMPLE VI

*Insensitivity of the coated electrode to variations in coating thickness*

A ⅛ inch nickel core having a coating ranging in thickness from 0.018 to 0.030 inch gave excellent results despite the wide variation in coating thickness. This is an important advantage and distinction over prior art welding electrodes in which the thickness of the coating was very critical. Thus, in prior art coated welding rods, slight variations in thickness or departures from concentricity had a deleterious effect upon the quality of the weld and the behavior of the weld rod in practical use.

EXAMPLE VII

*Insensitivity to change in welding current*

Welding rods embodying the present invention have been found quite insensitive to wide variations in welding current. For example, a ⅛ inch welding rod embodying the present invention gave satisfactory results at welding currents ranging from about 80 to 120 amperes. Prior art welding electrodes of comparable size generally could not tolerate a variation in welding current outside the range of 80 to 100 amperes. This greater tolerance exhibited by the weld rods of the present invention is of extreme practical importance as the rod can be supplied with current from welding generators of various types and the use of high welding currents is permissible where desired, e. g., in lining large containers where fusion not only of the nickel lining sheet but bonding to the underlying steel is required.

Extensive tests have shown that satisfactory results in commercial scale welding may be obtained with various diameter welding rods embodying the present invention within the ranges of amperages given in Table IX, the optimum value for a given diameter electrode depending on the conditions of welding.

*Table IX*

| Electrode diameter (inch) | Welding current |
|---|---|
| | Amperes |
| .075 | 40–50 |
| 3/32 | 60–80 |
| 1/8 | 80–120 |
| 5/32 | 140–180 |

Although the present invention has been described in connection with certain specific embodiments, it is to be understood that variations and modifications in composition and proportions of ingredients may be made without departing from the spirit and scope of the invention as set forth in the appended claims.

We claim:

1. A nickel arc welding electrode having a coating comprising about 70 parts calcium fluoride, about 30 parts sodium fluoride, about 90 parts of nickel-titanium alloy having about 25% titanium, about 5 parts graphite, and dextrine from potato or tapioca sources binding the foregoing ingredients into a coating resisting flaking when the rod is subjected to the "burn-off test," substantially as herein described, said dextrine amounting to about 6% to 11% of the weight of the coating.

2. A nickel arc welding electrode having a coating comprising about 70 parts calcium fluoride, about 30 parts sodium fluoride, about 22 parts titanium in the form of a nickel-titanium alloy, about 5 parts carbon, and dextrine from potato or tapioca sources having a solubility rating of about 38% binding the foregoing ingredients to the electrode, said dextrine amounting to about 6% to 11% of the weight of the coating.

3. A nickel arc welding rod having a coating comprising about 60 to 80 parts calcium fluoride, about 40 to 20 parts sodium fluoride, about 20 to 25 parts titanium in the form of a nickel-titanium alloy, about 2 to 8 parts carbon, and dextrine from about 6% to 11% by weight of the coating, said dextrine having a solubility rating of about 30–55%.

4. A nickel arc welding rod having a coating comprising about 50 to 90 parts calcium fluoride, about 50 to 10 parts sodium fluoride, about 10 to 30 parts titanium, carbon not exceeding 20 parts, and dextrine binding the foregoing ingredients into a coating resisting flaking when the rod is subjected to the "burn-off test," substantially as herein described, said dextrine amounting to about 6% to 11% of the weight of the coating.

5. An arc welding rod having a coating comprising about 60 to 80 parts calcium fluoride, about 40 to 20 parts sodium fluoride, about 10 to 30 parts titanium as an alloy with a carrier metal compatible with the rod, carbon from about 2 to 8 parts, and dextrine from about 6% to 11% by weight of the coating.

6. An arc welding rod having a coating comprising about 50 to 90 parts calcium fluoride, about 50 to 10 parts sodium fluoride, at least about 10 parts titanium and dextrine from about 6% to 11% by weight of the coating.

7. An arc welding rod having a coating consisting essentially of calcium fluoride, sodium fluoride, titanium in the form of an alloy with a metal compatible with the rod, and dextrine; the calcium fluoride being at least equal to the sodium fluoride but not over nine times the amount thereof, the titanium being at least about 10% of the coating, and the dextrine amounting to about 6% to 11% by weight of the coating, said dextrine binding the ingredients into a coating resisting flaking when the rod is subjected to the "burn-off test," substantially as herein described.

8. A coating for welding rods having a core made of nickel and nickel alloys, said coating being characterized by its insensitivity to variation in composition of the core and comprising about 50 to 90 parts calcium fluoride, 50 to 10 parts sodium fluoride, 10 to 30 parts titanium in the form of a nickel-titanium alloy, carbon not exceeding about 20 parts, and dextrine amounting to about 6% to 11% of the weight of the coating.

9. As a new composition of matter for use as a coating on electric arc welding rods, an extrudable mass comprising about 50 to 90 parts powdered calcium fluoride, 50 to 10 parts powdered sodium fluoride, 10 to 30 parts powdered titanium as an alloy with a carrier metal, powdered carbon not exceeding about 20 parts, dextrine from about 6 to 11% of the weight of the foregoing ingredients and sufficient water to render the mass plastic.

10. As a new composition of matter for use as a coating on electric arc welding rods, an extrudable mass containing as essential ingredients calcium fluoride, sodium fluoride, titanium, and dextrine, the calcium fluoride being at least equal to the sodium fluoride but not over 9 times the amount thereof, the titanium being at least about 10% of the calcium fluoride and sodium fluoride, the dextrine amounting to about 6% to 11% by weight of the dry ingredients, and sufficient water to render the mass plastic.

11. As a new composition of matter for use as a coating on electric arc welding rods, an extrudable mass containing as essential ingredients an alkaline earth metal fluoride, an alkali metal fluoride, titanium, and carbonaceous material, the alkaline earth metal fluoride being at least equal to the alkali metal fluoride but not over 9 times the amount thereof, the titanium being at least about 10% of the alkaline earth metal and alkali metal fluorides, the carbonaceous material including dextrine amounting to about 6% to 11% by weight of the dry ingredients and sufficient water to render the mass plastic.

12. The method of forming a coating on a welding rod comprising mixing powdered calcium fluoride, sodium fluoride, titanium and carbon to produce a substantially homogeneous dry mixture, preparing a solution of dextrine and water, heating the dextrine solution for at least about 15 minutes at a temperature of about 155 to 185° F. to impart satisfactory binding properties thereto, combining the dextrine solution with the homogeneous dry mixture of the powdered ingredients to form a plastic mass, extruding the plastic mass around the welding rod, and drying the extruded coating whereby a coating is produced having satisfactory adhesion and uniform burn-off.

13. The method of coating welding rods comprising mixing powdered calcium fluoride having a packing density of about 1.3 to 1.5, powdered sodium fluoride having packing density of about 0.7 to 0.8, powdered nickel-titanium alloy and powdered graphite to form a homogeneous mixture; mixing in water at a temperature of about 160° F. a dextrine of potato or tapioca origin characterized by its ability to bind the foregoing ingredients into a coating resisting flaking when the rod is subjected to the "burn-off test" substantially as herein described; holding the dextrine solution at about 160° F. for at least about 15 minutes; combining the homogeneous mixture of powdered ingredients with the dextrine solution to form a plastic mass; extruding the plastic mass around the welding rod; and drying the coating.

14. The method of preventing flaking of dextrine bonded coatings applied by extrusion on welding rods which comprises exposing the coated rods to heat treatment within the temperature range of about 200° to 500° F. for a period of time insufficient substantially to impair the adhesion.

15. In the preparation of a coated welding rod from a plastic mass comprised of powdered calcium fluoride, powdered sodium fluoride, powdered titanium alloy, powdered carbon, dextrine and water, the steps comprising extruding a coating of the plastic mass around the welding rod and then heating the coated rod for about 2 to 4 hours at about 400° F.

THEODORE EPHRAIM KIHLGREN.
RAYMOND FRANCIS VINES.